Figure 1:
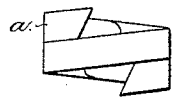

(No Model.)

M. G. CRANE.
LOCK NUT.

No. 327,773. Patented Oct. 6, 1885.

Witnesses.
John F. C. Prinkert
H. Currey Marsh.

Inventor.
Moses G. Crane.
by Crosby Gregory attys.

UNITED STATES PATENT OFFICE.

MOSES G. CRANE, OF NEWTON, MASSACHUSETTS.

LOCK-NUT.

SPECIFICATION forming part of Letters Patent No. 327,773, dated October 6, 1885.

Application filed May 19, 1884. Serial No. 132,032. (No model.)

*To all whom it may concern:*

Be it known that I, MOSES G. CRANE, of Newton, county of Middlesex, State of Massachusetts, have invented an Improvement in Lock-Nuts, of which the following description, in connection with the accompanying drawings, is a specification, like letters on the drawings representing like parts.

My invention, relating to lock-nuts, has for its object to produce a nut which when turned onto the male thread of the bolt or similar article will hold tight, so as not to be loosened or accidentally turned off by jarring or otherwise. The nut is threaded to fit the male thread, and then before applying the said nut to the bolt portions of the nut, each containing a number of complete or nearly complete turns of the thread, are moved longitudinally, the metal of the nut being made in layers or folds, separated transversely to its axis to admit of such longitudinal movement of the thread, and in turning the nut onto the male thread the portion of the nut that has been moved will be wedged back to nearly the original position, but will exert a pressure upon the thread derived from the strain produced in the material of the nut, which pressure will cause such friction as to effectually prevent the rotary movement of the nut, except when positively turned by a wrench or otherwise.

In making lock-nuts in accordance with this invention I wind the metal that is to form the body of the nut, and then after the said body has been properly shaped in dies I partly separate the successive folds or coils of the material and then cut the thread, after which the said folds or coils will be forced back to the original position, thereby changing the position of the threads, so that in turning the nut upon the male thread the latter will tend to again separate the portions of the nut, thus producing the desired strain or elastic pressure on the threads.

If desired, the thread can be cut while the parts of the nut are contracted, or as near together as possible, and the said parts subsequently expanded or separated, so that they will again be contracted in turning the nut upon the male thread.

I am aware that nuts have been made of a spirally-wound strip of metal having the thread of smaller diameter than that of the bolt, and thus expanding radially outward when turned onto the bolt; but it is exceedingly difficult to turn or start such a nut on the bolt, as the threads do not fit. Solid nuts have also been made, cut into in various directions, and having the part on one side of such cut moved or distorted with relation to that on the other side to produce friction on the male thread; but such nuts when distorted circumferentially are difficult to turn onto the bolt, and when distorted parallel with the axis of the nut bind only on a small part of the thread, instead of bearing frictionally entirely around the bolt. Nuts have also been made of two parts connected at one side of the nut and held by a key or wedge in a strained condition while the thread is being cut, and until after the nut is applied to the bolt, when the nut is tightened or locked by removing the said wedge or applying another. Such a nut requires an additional independent piece for its construction or operation, which is very objectionable.

Figure 3:
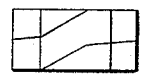
Figure 2:
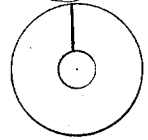
Figure 4:
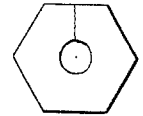
Figure 5:
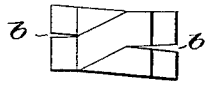
Figure 7:
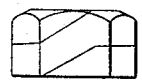
Figure 6:
Figure 8:

Figures 1 and 2 are a side elevation and plan view, respectively, of a piece of metal coiled to form the body of a nut embodying this invention; Figs. 3 and 4, similar views showing the nut-body properly shaped externally; Fig. 5, an elevation thereof extended or having its parts separated prior to threading; Fig. 6, a plan view of the same threaded; Figs. 7 and 8, a side elevation and plan view of the finished nut.

In the manufacture of lock-nuts embodying this invention in accordance with the most desirable method a band or strip of metal, $a$, Fig. 1, is wound into a spiral coil, as shown in Figs. 1 and 2, containing sufficient material to form the body of the nut, after which the said coil may be pressed in a mold to give it the desired shape externally for a nut, as shown in Figs. 3 and 4, the material being sufficiently heated before molding to cause the metal to flow readily so as to fill the mold, but not sufficiently to cause the different surfaces to weld together or unite with one another. The nut-body is then preferably separated or opened out at one or more places, as shown at $b$, Fig. 5, to thus change the relative position of the parts of the material longitudinally or parallel with the axis of the thread or bolt upon which it is to be turned. The nut-body thus opened, as shown in Fig. 5, is then threaded, as shown in Fig. 6, and then compressed or restored to its original condition and finished, as shown in Figs. 7 and 8. In thus compressing the nut the threads are distorted from their natural condition, or, in other words, the threads of one coil of the nut with relation to those of a succeeding coil being normally disturbed, or out of the wind required to fit the bolt, so that in turning onto a bolt the threads of the nut will not fit those of the bolt, but the latter will force those of the nut into the position in which they will fit, overcoming the elasticity of the material of the nut, which will in its turn react with a pressure upon the threads of the bolt sufficient to prevent the nut from turning until positively operated by a suitable wrench.

It is obvious that the nut may be threaded while in its contracted condition and then separated to distort the thread, in which case it will be again contracted when screwed upon the male thread.

I claim—

A nut composed of a succession of coils of metal, each coil being provided with several turns of thread to fit the bolt with which the nut is to be used, the threads of one coil with relation to those of a succeeding coil being normally disturbed or out of the wind required to fit the bolt, substantially as described.

In testimony whereof I have signed my name to this specification in the presence of two subscribing witnesses.

MOSES G. CRANE.

Witnesses:
JOS. P. LIVERMORE,
W. H. SIGSTON.